United States Patent [19]

Wyland et al.

[11] Patent Number: 5,419,724
[45] Date of Patent: May 30, 1995

[54] STERN TUBE BEARING SYSTEM FOR CONTRA-ROTATING PROPELLER SHAFTS OF A WATER-BORNE SHIP

[75] Inventors: Harald Wyland, deceased, late of Hamburg, by Heidi Wyland, heir; Heinz-Günter Ehluss, Tornesch, both of Germany

[73] Assignee: Blohm+Voss AG, Hamburg, Germany

[21] Appl. No.: 142,594

[22] Filed: Oct. 22, 1993

[30] Foreign Application Priority Data

Oct. 23, 1992 [DE] Germany .................. 42 35 737.3

[51] Int. Cl.$^6$ .............................................. B63H 5/06
[52] U.S. Cl. ........................................... 440/79; 464/8
[58] Field of Search ................ 440/75, 79, 80, 81, 440/83, 78; 464/8; 416/124, 128, 129 A, 174

[56] References Cited

U.S. PATENT DOCUMENTS 4,786,264  11/1988  Asanabe et al. ............... 416/129 A

FOREIGN PATENT DOCUMENTS 0221536  8/1990  Germany .
1037421  7/1966  United Kingdom .

*Primary Examiner*—Jesus D. Sotelo
*Attorney, Agent, or Firm*—Nils H. Ljungman & Associates

[57] ABSTRACT

A stern tube bearing system for contra-rotating ship's propellers with concentric shafts is configured such that the oil feed to the bearing for the inner shaft is configured so that essentially only the oil ducts located in the lower portion of the rotational path of the bearing are in communication with the oil supply to essentially supply a substantial portion of the oil flow to the lower, load bearing surfaces of the bearing.

19 Claims, 5 Drawing Sheets

STERN TUBE BEARING SYSTEM FOR CONTRA-ROTATING PROPELLER SHAFTS OF A WATER-BORNE SHIP

BACKGROUND OF THE INVENTION

1. Field of the Invention

This invention generally relates to a ship, in particular, to a deep-draft vessel configured for travel on the oceans and great lakes. Such a ship could be outfitted with a stern tube having two contra-rotating propellers. In such a case, the propellers will be driven by concentrically rotating propeller shafts, with a rearmost propeller connected to an inner shaft, and a forward propeller connected to a hollow outer shaft in which the inner shaft is disposed. The inner shaft and the outer shaft preferably rotate in opposite directions to one another, and the arrangement will generally include at least one bearing for the inner shaft, which bearing can preferably be disposed between the inner shaft and the outer shaft.

In general it is also necessary to provide lubricant to the bearing surfaces to reduce the friction at the surfaces between the bearing and the rotating shaft adjacent the bearing.

2. Background Information

When an inner shaft is mounted in a contra-rotating outer shaft, problems can occur unless a sufficient quantity of lubricant can be supplied to the bearing area.

A stern tube bearing system of the type described above is disclosed in European Patent No. A2-0 221 536. In the arrangement disclosed by this patent, the inner shaft is hollow, and in the vicinity of the bearing, has a number of radial holes to supply oil to the bearing surfaces. As such, oil under high pressure is transported via the cavity of the inner shaft to the oil ducts, and thence into the bearing gap between the bearing and the shaft surface adjacent the bearing. One disadvantage of such an arrangement, however, is that, due to the rotation of the inner shaft, oil is also forced into the upper portion of the bearing gap through the radial oil ducts which are distributed around the circumference of the inner shaft. In and of itself, that is not critical with regard to the lubrication, but it has an adverse effect on the oil supply in the critical lower portion of the bearing, or the portion which substantially bears the weight of the shaft.

OBJECT OF THE INVENTION

The object of the present invention is to provide a bearing system for contra-rotating shafts, in particular on ships with inner and outer shafts and contra-rotating propellers, which bearing system provides an improved lubrication of the bearing surfaces.

SUMMARY OF THE INVENTION

The invention teaches that this object can be achieved in a stern tube bearing system of the type described above by connecting the oil ducts which feed into the bearing gap to a rotary transmission lead-through. In this manner, preferably only the oil ducts located in the lower portion of their rotational path are connected to the oil supply.

With such a stern tube bearing system according to the present invention, therefore, a substantial portion of a flow of pressurized oil can preferably be delivered only to the critical lower portion of the bearing gap. In this manner, it can be possible to operate the shaft assembly with a relatively low oil pressure. The invention also makes it possible to prevent damage to the shaft, and in particular to the lower portion of the shaft during startup.

There are several possible ways in which the oil can be brought into the bearing gap, e.g. via oil lines in possibly the outer shaft, in the bearing bush itself, or even via an axial hole in the inner shaft. These lines can generally be oriented parallel to the axis. But the lines can just as well be oriented diagonally, i.e. from the outside, they can run inward in the longitudinal direction toward the bearing point. When these lines are oriented parallel to the axis, there must be radial holes at the two terminal points, while with an axial-radial orientation, the connection between the bearing and the rotary transmission lead-through can be achieved by means of a single hole.

A rotary transmission lead-through can generally be described as a device in which a fixed, (or non-rotating) fluid feed, that is, the input, supplies fluid to rotating parts, e.g. shafts with radial holes and/or holes parallel to the axis, that is, the output.

In one preferred embodiment of the present invention, the oil ducts can preferably be connected to the rotary transmission lead-through by means of holes running in the outer shaft, whereby these feed holes can preferably be oriented parallel to the axis. In an additional preferred embodiment of the rotary transmission lead-through, there can preferably be a non-rotating ring surrounding the outer shaft, which ring can preferably be designed with an inwardly-open cage, and also a linking ring which does not rotate in the cage and rides on the outer shaft. Whereby between the linking ring and the cage there can preferably be a ring-shaped gap, which in turn can transport the lubricant, which can be oil, from the lubricant supply source to the holes in the outer shaft.

Such a rotary transmission lead-through can preferably have two parts, whereby the linking ring can be configured to move radially in the cage to execute radially-oriented movements, as such radially oriented movements are generally necessary due to fluctuations between the shafts given the load and bending of the shaft.

In one configuration of the linking ring according to the present invention, the linking ring can have at least one radial hole in its lower region, which leads into a ring groove which is open on the inside and can preferably be connected there with at least one, or preferably two of the holes of the outer shaft. In the area opposite the ring groove there can preferably be, laterally, next to the radial holes of the outer shaft, pressure equalization ring grooves to prevent a unilateral radial load on the linking ring. These grooves can be connected to the surrounding outer ring gap via radial holes.

One aspect of the invention resides broadly in a propeller assembly for a deep draft ship. The deep draft ship has a hull for being borne by water, and the propeller assembly comprises: inner and outer propeller shafts disposed concentrically to one another and passing through the hull, the inner and outer propeller shafts being configured to rotate in opposite directions with respect to one another; at least first seal apparatus for sealing between the outer propeller shaft and the hull to provide a substantially fluid-tight seal between the outer propeller shaft and the hull; at least second seal apparatus for sealing between the inner and outer propeller shafts to provide a fluid-tight seal between the inner and outer propeller shafts; and at least one bearing disposed between the inner shaft and the outer shaft. The at least one bearing comprises: a first surface disposed adjacent the inner shaft, a second surface disposed adjacent the outer shaft; and at least a first portion and a second portion, the second portion being different from the first portion, and each of the first and the second portions comprising substantial portions of the bearing; the first portion of the bearing comprises an upper portion and the second portion comprises a lower portion, the lower portion being disposed substantially vertically below the upper portion. And the propeller assembly further comprises apparatus for conducting lubricant to at least one of the first and second bearing surfaces, the apparatus for conducting being configured to conduct a substantial portion of the lubricant to only the lower portion of the bearing.

Another aspect of the invention resides broadly in a propeller assembly for a ship. The ship has a hull for being borne by water, and the propeller assembly comprises: inner and outer propeller shafts disposed concentrically to one another and passing through the hull, the inner and outer propeller shafts being configured to rotate in opposite directions with respect to one another; and at least one bearing disposed between the inner shaft and the outer shaft. The at least one bearing comprises: a first surface disposed adjacent the inner shaft, a second surface disposed adjacent the outer shaft; and at least a first portion and a second portion, the second portion being different from the first portion, and each of the first and the second portions comprising substantial portions of the bearing. And the propeller assembly further comprises apparatus for conducting lubricant to at least one of the first and second bearing surfaces, the apparatus for conducting being configured to conduct a substantial portion of the lubricant to only one of the first and the second portions of the bearing.

One additional aspect of the invention resides broadly in a propeller assembly for a ship. The ship has a hull for being borne by water, and the propeller assembly comprises: inner and outer propeller shafts disposed concentrically to one another and passing through the hull, the inner and outer propeller shafts being configured to rotate in opposite directions with respect to one another; at least one bearing disposed between the inner shaft and the outer shaft, the at least one bearing having a first surface disposed adjacent the inner shaft, and a second surface disposed adjacent the outer shaft; and apparatus for conducting lubricant to at least one of the first and the second bearing surfaces at a bearing position fixed relative to the hull of the ship.

BRIEF DESCRIPTION OF THE DRAWINGS

The invention is explained below with reference to the accompanying drawings, in which.

DESCRIPTION OF THE PREFERRED EMBODIMENTS

Figure 1:
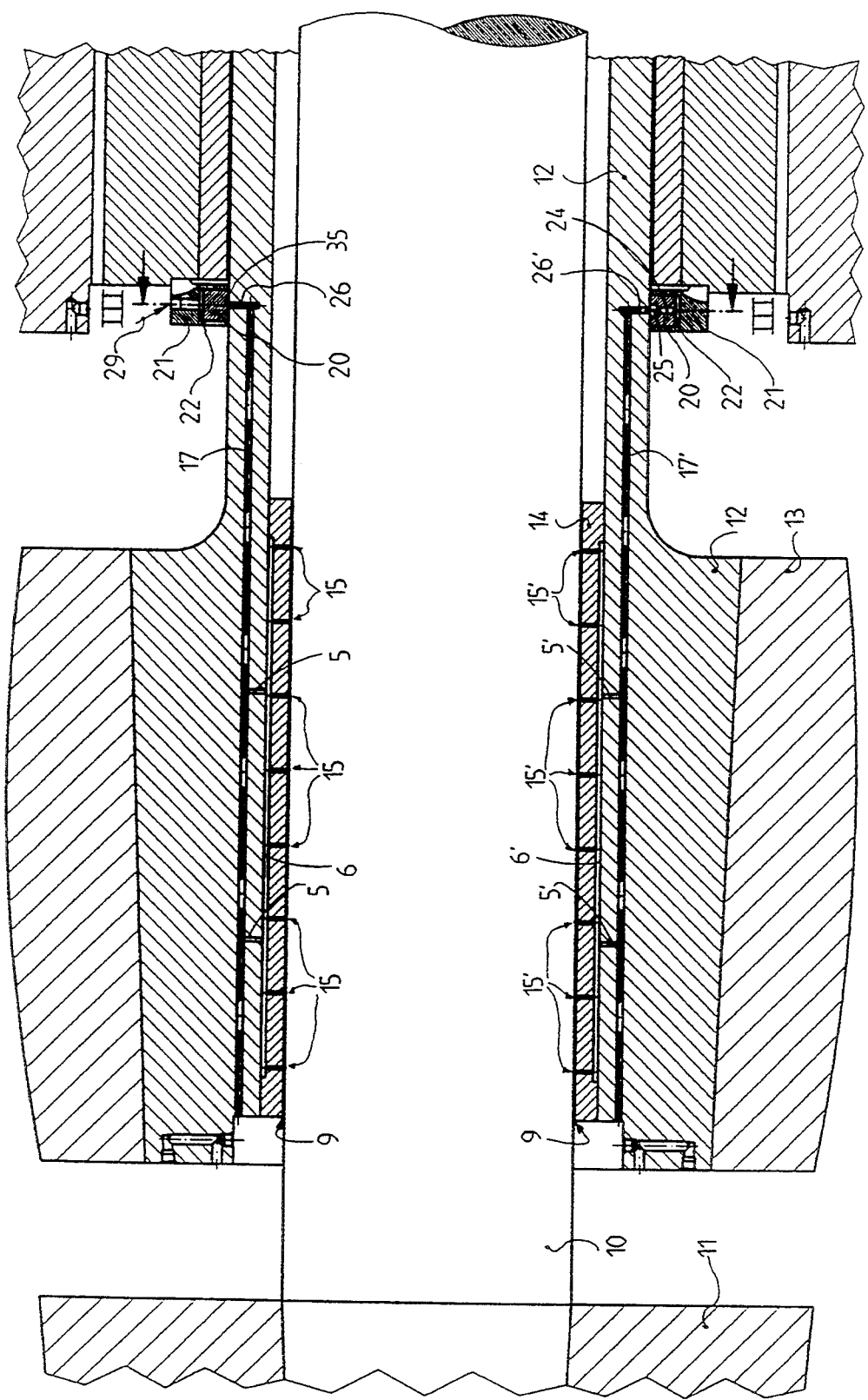
FIG. 1 shows, in detail, a longitudinal cross section of a stern tube-bearing system according to the present invention.
Figure 1A:
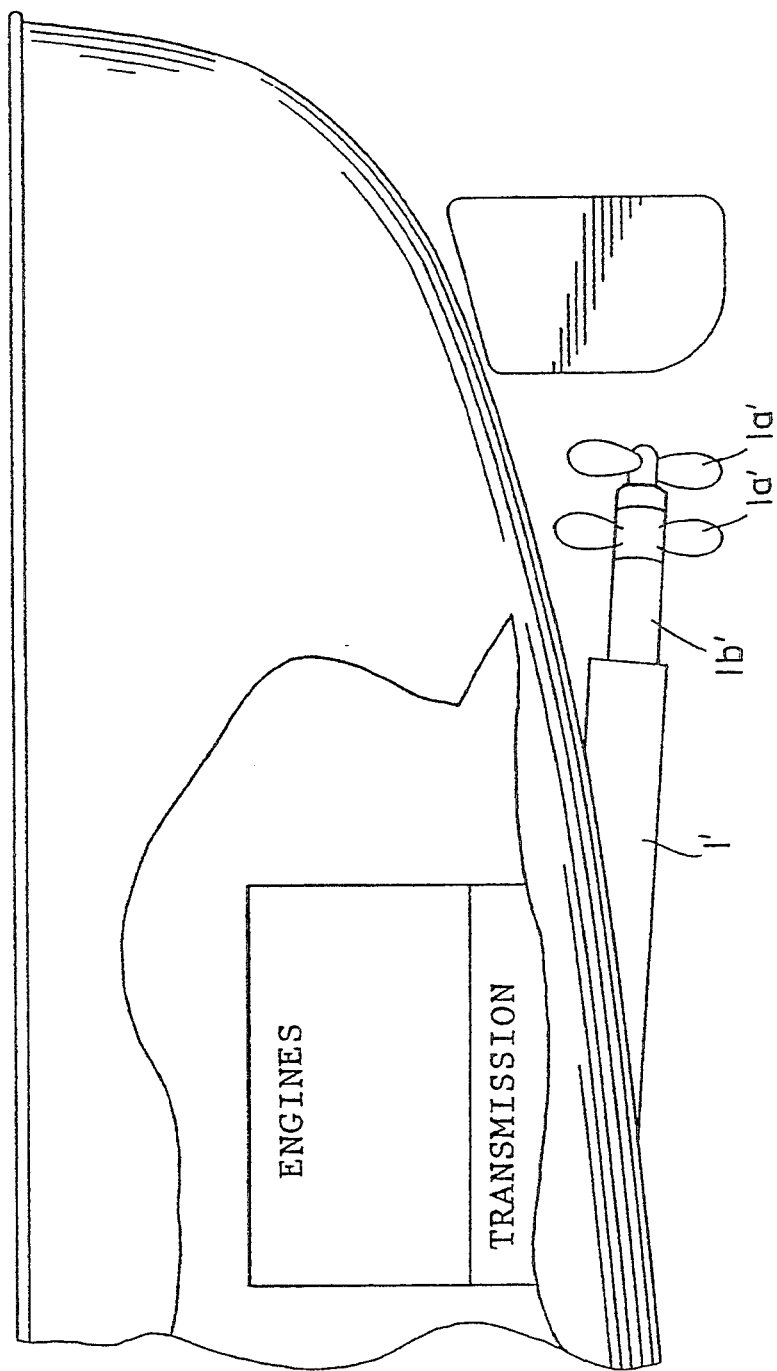
FIG. 1a shows a stern tube of a ship, with contra-rotating propellers.

FIG. 1a generally shows the bottom rear portion of a hull of a ship with propellers 1a'. Extending rearwardly from the hull is a stern tube 1'. The propeller shafts 1b' pass from the interior of the ship to the exterior thereof through the stern tube 1'. The propellers 1a' can be affixed to the ends of the shafts 1b'.

Figure 1B:
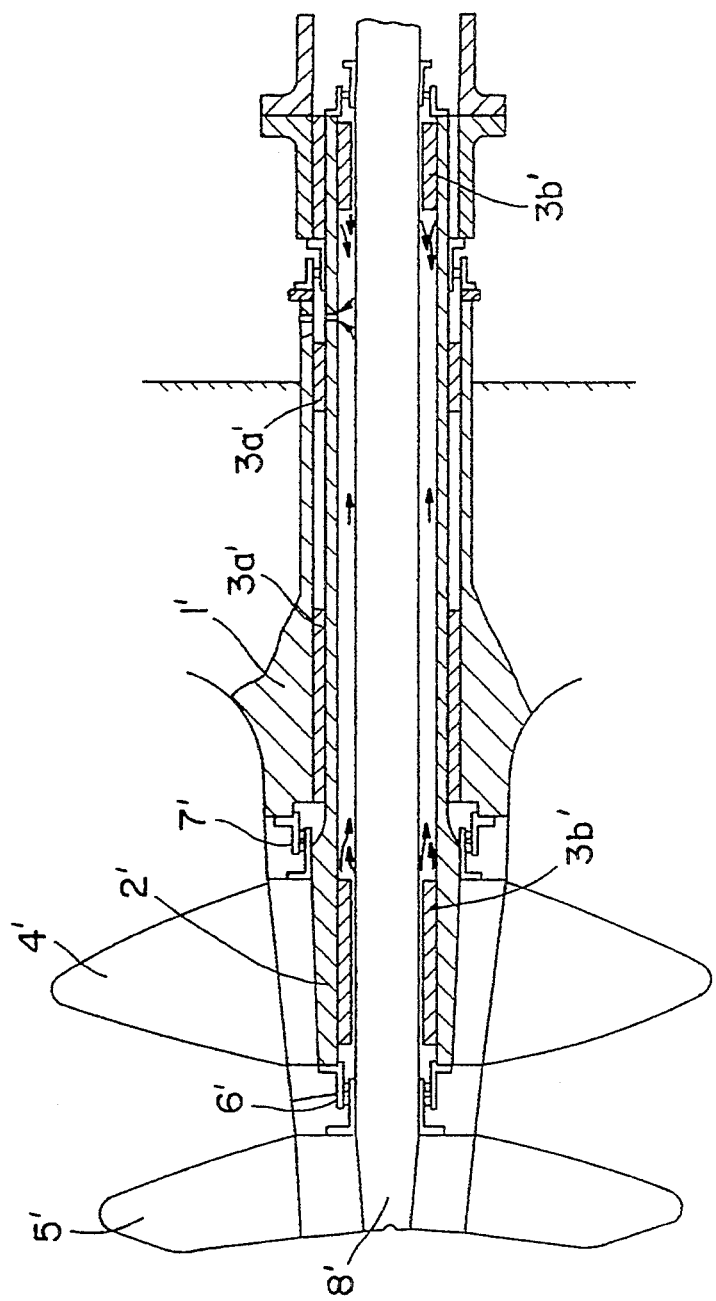
FIG. 1b shows a general overall view of an arrangement of propellers and propeller shafts.

FIG. 1b essentially depicts, in more detail, an arrangement of contra-rotating propellers 4' and 5' and the respective drive shafts 2' and 8'. In FIG. 1b, the stern tube is generally indicated as 1', and the concentric propeller shafts 2' and 8' pass through this stern tube 1'. In this embodiment, the outer shaft 2' can preferably be designed as a hollow shaft, and can be mounted in friction bearings 3a'. Within the hollow cavity of the outer shaft 2', the inner shaft 8' can preferably be mounted in friction bearings 3b'. The outer shaft propeller is designated as 4', and the inner shaft propeller is designated as 5'. An inner shaft seal 6' can preferably be disposed between the two propellers 4' and 5', and an outer shaft seal 7' can preferably be located between the outer propeller shaft 2' and the rear end of the stern tube 1'.

Figure 2:
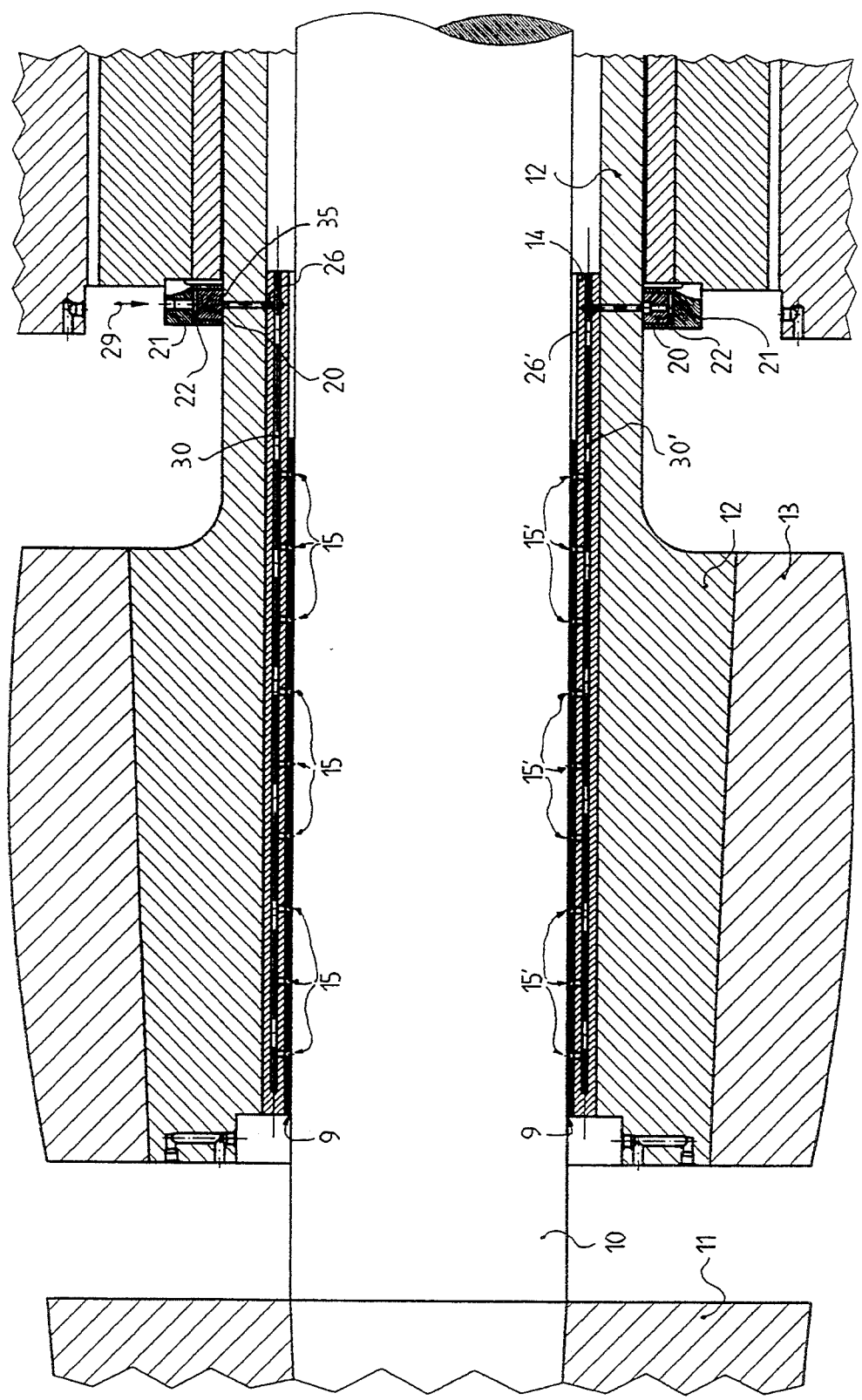
FIG. 2 shows a longitudinal cross section of an additional stern tube bearing system according to the present invention.
Figure 3:
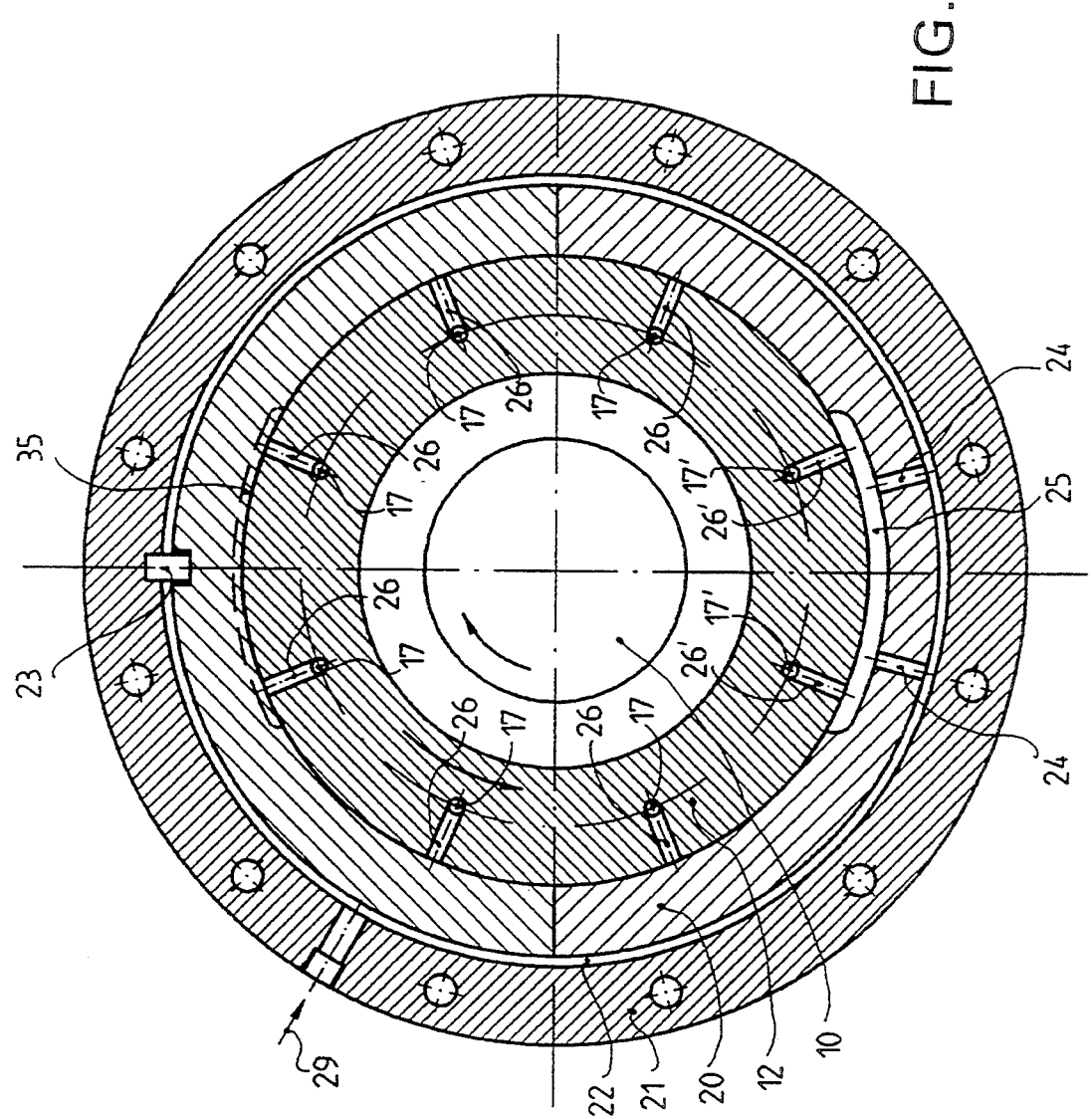
FIG. 3 shows a cross section taken along line III—III in FIG. 1.

In the remaining figures, that is, FIGS. 1, 2 and 3, the inner shaft of a ship is depicted as 10, whereby on the right side of FIGS. 1 and 2, the viewer should imagine the inside of the ship's hull and the drive system, as generally depicted in FIG. 1a. A portion of the rear propeller which sits on the shaft 10 is designated as 11.

The inner shaft 10 is substantially surrounded by an outer shaft 12, which also extends from the engine located inside the ship's hull to outside the ship's hull. The outer shaft 12 can preferably have an expanded section on its exposed end which can be used to attach a propeller 13 to the outer shaft 12. The outer shaft 12 and the inner shaft 10 can preferably have bearings with one another at two points (depicted as 3b' in FIG. 1b). FIG. 1 essentially shows only the one bearing 14, which is located outside the ship's hull. This bearing 14 can preferably be rigidly connected on its outside circumference with the outside shaft 12, and on its inside surface can form a bearing gap 9 with the inner shaft 10.

This bearing gap 9 is generally considered to be the critical area in terms of lubrication. If, for example, the outer shaft 12 and thus the bearing 14 were standing still, then the rotation of the inner shaft 10 would produce an effect which is generally described by saying that the journal would be floating in its bearing on an oil film. However, such a protective oil film may not properly form if the bearing 14 or the shaft 12 are rotated in the opposite direction from the direction of rotation of the shaft 10.

In accordance with the present invention, the bearing 14 can preferably have a number of oil ducts 15 and 15'. These ducts can preferably be distributed over both the circumference and the length of the bearing 14. An arrangement of individual oil ducts can be connected to one another by means of axial grooves 6, 6' whereby these grooves can, in turn, be connected by means of radial lines 5, 5' to axial holes 17, 17' in the outer shaft 12. The axial holes 17 and 17' can lead into the vicinity of the rotary transmission lead-through, which is designated by parts 20–22, and is discussed in more detail hereinbelow. The axial holes 17, 17' can then be connected to the rotary transmission lead-through via feed lines 26 and 26'.

FIG. 2 shows an alternative embodiment wherein the oil feed can takes place through axial holes 30, 30' disposed within the bearing bush 14. In this embodiment, the axial grooves 6, 6' are essentially replaced by the axial holes 30, 30', while the radial lines 5, 5' can essentially be eliminated. The oil feed thereby preferably takes place from the transmission lead-through, via feed lines 26, 26', directly to holes 30, 30', and then directly to oil ducts 15, 15' from holes 30, 30'.

As shown in FIGS. 1 and 2, the rotary transmission lead-through can have a stationary ring 21 which can preferably be fastened to the stern tube of the ship. This stationary ring 21 preferably encloses an interior space, or cage, which can be open inwardly towards the outer shaft 12, but which is closed on both sides in the axial direction and radially outward by the body of the ring 21.

Inside the cage of the outer ring 21, there can preferably be a linking ring 20, which can preferably be designed to have a diameter somewhat smaller than the interior diameter of the cage of the ring 21. With such a configuration, the linking ring 20 can preferably form a ring-shaped gap 22 between the ring 20 and the interior of the cage of the ring 21. This configuration can also allow radial movements of the linking ring 20 within the cage of the ring 21. The ring-shaped gap 22 preferably extends over the entire circumference of the linking ring 20. In the upper portion, the feed of oil into the ring-shaped gap 22 is schematically indicated by an arrow 29.

As depicted in FIG. 3, in the lower portion of the linking ring 20, the linking ring 20 can preferably have a groove 25 which extends in the circumferential direction. The circumferential groove 25 can preferably extend over approximately one-quarter, or even less of the total circumference of the linking ring 20. As depicted, the groove can extend about 1/6 of the total circumference to periodically accomodate at least two of the passages 26''. This groove 25 can preferably be connected outwardly by two axial holes 24 to the ring-shaped gap 22, and inwardly by radial holes 26' as discussed above. The radial holes 26', in the depicted embodiment of FIG. 3, are preferably connected to corresponding ones of the axial holes 17' of the outer shaft. The configuration illustrated in FIG. 3 is characterized by the fact that oil under pressure is transported under pressure via the oil feed 29 into the ring-shaped gap 22, from there via the transverse holes 24 into the ring-shaped groove 25, which groove 25 is preferably connected only with the radial holes 26' and the transverse holes 17' which are in the lower portion of the shaft during the shaft rotation. Accordingly, oil under pressure travels only through these lower holes 17' through the oil ducts 15' located in the lower portion of the bearing bush 14 into the lower portion of the bearing gap 9.

The transmission can also preferably be configured to have pressure equalization ring-shaped grooves 35 disposed preferably diametrically opposite the groove 25. Such a pressure equalization ring 35 can essentially allow the pressure within adjacent ones of the axial holes to equalize.

The bearing arrangement can also preferably include a connection device 23, which can be a simple pin, disposed between the linking ring 20 and the cage ring 21 to rotationally connect the linking ring 20 and the cage ring 21 to one another. In the embodiment as depicted in the figures, since the cage ring 21 is preferably fastened in a non-rotating manner to the stern tube, the linking ring is therefore also held in a fixed position with respect to the rotating shafts.

One feature of the invention resides broadly in the stern tube bearing system for contra-rotating ship's propellers with an inner shaft 10 with a rear propeller 11, and an outer shaft 12 with a forward propeller 13, whereby the inner shaft is oriented concentrically inside the hollow outer shaft, and the inner shaft and the outer shaft rotate in opposite directions, with a bearing 14 for the inner shaft 12 between the inner and the outer shaft, and with oil ducts leading into the bearing gap 9 and distributed over the circumference, characterized by the fact that the oil ducts 15, 15' are connected to a rotary transmission lead-through 20, 21, 22 so that only the oil ducts 15' located in the lower portion of their rotational path have a flow connection to the oil supply 29.

Another feature of the invention resides broadly in the stern tube bearing system, characterized by the fact that the oil ducts 15, 15' are connected by means of holes 17, 17', running in the outer shaft 12 to the rotary transmission lead-through 20, 21, 22, which holes 17, 17' preferably run parallel to the axis.

Still another feature of the invention resides broadly in the stern tube bearing system, characterized by the fact that the rotary transmission lead-through is formed: by a stationary ring 21 surrounding the outer shaft 12 which is designed with a cage 21 which is open axially inward, and is closed in both directions and radially, and by a linking ring 20 located in a non-rotating manner in the cage and in contact against the outer shaft 12, which with its outside circumferential surface and the base of the cage, or inner circumferential surface of the cage, form a ring-shaped gap which is enclosed over its circumference, which gap is connected on one hand to the oil supply 29 and on the other hand to the holes 17' in the outer shaft 12 located along its path.

Yet another feature of the invention resides broadly in the stern tube bearing system, characterized by the fact that the linking ring 20 is equipped in its lower portion with at least one essentially radially-oriented hole 24, which leads to a ring groove 25 on its inside surface, which extends in the circumferential direction so that it forms a flow connection with at least one and preferably two of the holes 17' of the outer shaft 12.

Still yet another feature of the invention resides broadly in the stern tube bearing system, characterized by the fact that the holes 17, 17' in the vicinity of the cage 21 and of the linking ring 20 are each connected to holes 26, 26' which run radially and are distributed over the circumference.

All, or substantially all, of the components and methods of the various embodiments may be used with at least one embodiment or all of the embodiments, if any, described herein.

All of the patents, patent applications and publications recited herein, and in the Declaration attached hereto, are hereby incorporated by reference as if set forth in their entirety herein.

The corresponding foreign patent publication applications, namely, Federal Republic of Germany Patent Application No. P 42 35 737, filed on Oct. 23, 1992, having inventors Harald Wyland and Heinz-Günter Ehluss, and DE-OS P 42 35 737 and DE-PS P 42 35 737, as well as their published equivalents, and other equivalents or corresponding applications, if any, in corresponding cases in the Federal Republic of Germany and elsewhere, and the references cited in any of the documents cited herein, are hereby incorporated by reference as if set forth in their entirety herein.

The details in the patents, patent applications and publications may be considered to be incorporable, at applicant's option, into the claims during prosecution as further limitations in the claims to patentably distinguish any amended claims from any applied prior art.

The invention as described hereinabove in the context of the preferred embodiments is not to be taken as limited to all of the provided details thereof, since modifications and variations thereof may be made without departing from the spirit and scope of the invention.

What is claimed is:

1. A propeller assembly for a deep draft ship, the deep draft ship having a hull for being borne by water, and said propeller assembly comprising:
    inner and outer propeller shafts disposed concentrically to one another and passing through the hull, said inner and outer propeller shafts being configured to rotate in opposite directions with respect to one another;
    at least first seal means for sealing between the outer propeller shaft and the hull to provide a substantially fluid-tight seal between the outer propeller shaft and the hull;
    at least second seal means for sealing between the inner and outer propeller shafts to provide a fluid-tight seal between the inner and outer propeller shafts;
    at least one bearing disposed between the inner shaft and the outer shaft, said at least one bearing comprising:
        a first surface disposed adjacent said inner shaft,
        a second surface disposed adjacent said outer shaft; and
        at least a first portion and a second portion, said second portion being different from said first portion, and each of said first and said second portions comprising substantial portions of said bearing;
    said first portion of said bearing comprises an upper portion and said second portion comprises a lower portion, the lower portion being disposed substantially vertically below the upper portion; and
    means for conducting lubricant to at least one of said first and second bearing surfaces, said means for conducting being configured to conduct a substantial portion of the lubricant to only said lower portion of said bearing.

2. The assembly according to claim 1, wherein:.
    said bearing is attached to said outer shaft;
    said second surface of said bearing is fixedly attached to said inner surface of said outer shaft;
    said first surface of said bearing is relatively rotatable with respect to said inner shaft; and
    said means for conducting lubricant comprises means for conducting lubricant to said first surface at only said lower portion of the bearing.

3. The system according to claim 2, wherein:
    said propeller assembly defines a longitudinal axis about which said inner and said outer shafts rotate;
    said outer shaft has an inner surface disposed adjacent said at least one bearing, and an outer surface disposed away from said at least one bearing;
    said means for conducting lubricant comprises:
        a lubricant supply source;
        a plurality of first lubricant passages disposed circumferentially about and through said outer shaft from said outer surface thereof to said inner surface thereof to conduct lubricant to said at least one bearing, said plurality of first lubricant passages being rotatable about said inner shaft upon rotation of said outer shaft about said inner shaft;
        a plurality of second lubricant passages disposed circumferentially about said bearing and connected to said first lubricant supply passages to conduct lubricant from said first lubricant supply passages to said first bearing surface; and
        rotary transmission means connecting said lubricant supply source to ones of said plurality of first lubricant supply passages located adjacent said lower portion of said bearing to conduct said substantial portion of lubricant to only said lower portion of said bearing.

4. The system according to claim 3, wherein said rotary transmission means is fixedly attached to the hull, and said rotary transmission means comprises:
    a first outer ring shaped member disposed about said outer shaft and for being fixedly attached to the hull, said outer ring-shaped member having an inner circumferential surface for being disposed adjacent said outer surface of said outer shaft;
    said outer ring-shaped member comprising a channel along said inner circumferential surface, said channel having a diameter;
    a second inner ring-shaped member for being disposed within said channel of said outer ring-shaped member, said inner ring-shaped member having an external diameter, said external diameter being less than said diameter of said channel to form a ring-shaped gap between said inner ring-shaped member and said outer ring-shaped member;
    means for keeping said inner ring-shaped member from rotating within said outer ring-shaped member;
    said inner ring-shaped member having an inner surface disposed in radial contact with said outer surface of said outer shaft, said inner ring-shaped member being configured for rotation of said outer shaft within said inner surface thereof;
    said inner ring-shaped member having a lower portion for being disposed adjacent said lower portion of said bearing, and said inner surface of said inner ring-shaped member comprising a a chamber in said lower portion thereof;
    said chamber being fluidly connected to ones of said plurality of first lubricant supply passages as said ones of said plurality of first lubricant supply passages are rotated past said chamber;
    said outer ring-shaped member comprises a third lubricant supply passage disposed therethrough from said outer circumferential surface to said inner circumferential surface to fluidly connect said channel with said lubricant supply source; and
    said inner ring-shaped member comprising at least one fourth lubricant supply passage disposed therethrough to fluidly connect said channel with said chamber.

5. The system according to claim 4, wherein:
    said chamber has a length along a circumference of said inner surface of said inner ring-shaped member;

said ones of said plurality of first lubricant supply passages are disposed circumferentially about said outer shaft at regularly spaced apart intervals;

the length of said chamber is at least as long as said spaced apart intervals to continuously fluidly connect at least one of said first lubricant supply passages to said lubricant supply source, and periodically fluidly connect at least two of said first lubricant supply passages, upon said first lubricant supply passages rotating past said chamber;

said at least one bearing is disposed a distance away from the hull in a direction along said longitudinal axis;

at least a portion of each of said plurality of first lubricant supply passages is disposed axially within said outer shaft and parallel to the longitudinal axis along at least a portion of said distance between said at least one bearing and the hull;

each of said first lubricant supply passages comprises at least one additional passage portion disposed radially to said axial passage portions, said radial passage portions being disposed from said outer surface of said outer shaft to said axial passage portions within said outer shaft;

the length of said chamber is about 1/6th of the circumference of said inner surface of said inner ring-shaped member;

said plurality of first lubricant supply passages comprise eight lubricant supply passages and said spaced apart intervals comprise ⅛th of the circumference of said outer surface of said outer shaft;

said inner surface of said inner ring-shaped member comprises an additional chamber disposed substantially opposite to said chamber, said additional chamber being configured to periodically fluidly connect two of said first fluid supply passages to equalize fluid pressure within said two first lubricant supply passages;

said means for keeping said inner ring-shaped member from rotating comprises a pin disposed through at least a portion of each of said inner ring-shaped member and said outer ring-shaped member;

said inner ring-shaped member is configured to be radially movable within said channel to allow for fluctuations between said outer propeller shaft and the hull;

said at least one fourth fluid supply passage comprises two fourth fluid supply passages disposed spaced apart circumferentially from one another to provide essentially unobstructed lubricant access from said channel into said chamber during said fluctuations;

said second surface of said bearing comprises a plurality of axial grooves adjacent said inner surface of said outer shaft;

said first lubricant supply passages of said outer shaft further comprise additional radial lubricant passages disposed between said axial grooves and said axial passage portions;

said second lubricant supply passages are disposed from said axial grooves to said first bearing surface;

said second lubricant passages comprise a plurality of spaced apart rows of said second lubricant supply passages;

each of said plurality of spaced apart rows comprising a plurality of spaced apart ones of said second passages;

said bearing has a length;

said spaced apart ones of said second lubricant supply passages comprise regularly spaced ones of said second lubricant supply passages along a substantial portion of the length of said bearing to provide lubricant to said bearing along the substantial portion of the length of said bearing; and said lubricant comprises oil.

6. A propeller assembly for a ship, the ship having a hull for being borne by water, and said propeller assembly comprising:

inner and outer propeller shafts disposed concentrically to one another and passing through the hull, said inner and outer propeller shafts being configured to rotate in opposite directions with respect to one another;

at least one bearing disposed between the inner shaft and the outer shaft, said at least one bearing comprising:
a first surface disposed adjacent said inner shaft,
a second surface disposed adjacent said outer shaft; and
at least a first portion and a second portion, said second portion being different from said first portion, and each of said first and said second portions comprising substantial portions of said bearing; and means for conducting lubricant to at least one of said first and second bearing surfaces, said means for conducting being configured to conduct a substantial portion of the lubricant to only one of said first and said second portions of said bearing.

7. The system according to claim 6, wherein said at least a first portion and a second portion comprise bearing portions in a location fixed relative to the hull of the ship.

8. The system according to claim 7, wherein:

said first portion of said propeller assembly comprises an upper portion and said second portion comprises a lower portion, the lower portion being disposed substantially vertically below the upper portion; and said means for conducting lubricant comprises means for conducting lubricant to only said lower portion of the bearing.

9. The system according to claim 8, wherein:

one of said first and said second bearing surfaces is fixed to its corresponding one of said inner shaft and said outer shaft;

the other of said first and second bearing surfaces is relatively rotatable with respect to its corresponding one of said inner shaft and said outer shaft; and said means for conducting lubricant comprises means for conducting lubricant to the relatively rotatable one of said first and said second bearing surfaces at only said lower portion of the bearing.

10. The system according to claim 9, wherein:

said outer shaft has an inner surface disposed adjacent said at least one bearing, and an outer surface disposed away from said at least one bearing;

said means for conducting lubricant comprises:
a lubricant supply source;
a plurality of first lubricant passages disposed circumferentially about and through said outer shaft from said outer surface thereof to said inner surface thereof to conduct lubricant to said at least one relatively rotatable bearing surface, said plurality of first lubricant supply passages being rotatable about said inner shaft upon rotation of said outer shaft about said inner shaft; and rotary transmission means connecting said lubricant supply source to ones of said plurality of first lubricant supply passages located adjacent said lower portion of said bearing to conduct said substantial portion of lubricant to only said lower portion of said bearing.

11. The system according to claim 10, wherein:

said propeller assembly defines a longitudinal axis about which said inner and said outer shafts rotate;

said bearing is attached to said outer shaft;

said second surface of said bearing is fixedly attached to said inner surface of said outer shaft;

said first surface of said bearing is relatively rotatable with respect to said inner shaft; and said means for conducting lubricant comprise a plurality of second lubricant supply passages disposed circumferentially about said bearing and connected to said said first lubricant supply passages to conduct lubricant from said first lubricant passages to first bearing surface.

12. The system according to claim 11, wherein:

said rotary transmission means is fixedly attached to the hull;

said at least one bearing is disposed a distance away from the hull in a direction along said longitudinal axis; and at least a portion of each of said plurality of first lubricant supply passages is disposed axially within said outer shaft and parallel to the longitudinal axis along at least a portion of said distance between said at least one bearing and the hull.

13. The system according to claim 12, wherein said rotary transmission means comprises:

a first outer ring shaped member disposed about said outer shaft and for being fixedly attached to the hull, said outer ring-shaped member having an inner circumferential surface for being disposed adjacent said outer surface of said outer shaft;

said outer ring-shaped member comprising a channel along said inner circumferential surface, said channel having a diameter;

a second inner ring-shaped member for being disposed within said channel of said outer ring-shaped member, said inner ring-shaped member having an external diameter, said external diameter being less than said diameter of said channel to form a ring-shaped gap between said inner ring-shaped member and said outer ring-shaped member;

means for keeping said inner ring-shaped member from rotating within said outer ring-shaped member;

said inner ring-shaped member having an inner surface disposed in radial contact with said outer surface of said outer shaft, said inner ring-shaped member being configured for rotation of said outer shaft within said inner surface thereof;

said inner ring-shaped member having a lower portion for being disposed adjacent said lower portion of said bearing, and said inner surface of said inner ring-shaped member comprising a a chamber in said lower portion thereof;

said chamber being fluidly connected to ones of said plurality of first lubricant supply passages as said ones of said plurality of first lubricant supply passages are rotated past said chamber;

said outer ring-shaped member comprising a third lubricant supply passage disposed therethrough from said outer circumferential surface to said inner circumferential surface to fluidly connect said channel with said lubricant supply source; and said inner ring-shaped member comprising at least one fourth lubricant supply passage disposed therethrough to fluidly connect said channel with said chamber.

14. The assembly according to claim 13, wherein:

said chamber has a length along a circumference of said inner surface of said inner ring-shaped member;

said ones of said plurality of first lubricant supply passages are disposed circumferentially about said outer shaft at regular spaced apart intervals; and the length of said chamber is at least as large as said spaced apart intervals to continuously fluidly connect at least one, and periodically fluidly connect at least two of said first lubricant supply passages upon rotation of said first lubricant supply passages past said chamber.

15. The assembly according to claim 14, wherein:

each of said first lubricant supply passages comprises at least one additional passage portion disposed radially to said axial passage portions, said radial passage portions being disposed from said outer surface of said outer shaft to said axial passage portions within said outer shaft;

the length of said chamber is about 1/6th of the circumference of said inner surface of said inner ring-shaped member;

said plurality of first lubricant supply passages comprise eight lubricant supply passages and said spaced apart intervals comprise ⅛th of the circumference of said outer surface of said outer shaft;

said inner surface of said inner ring-shaped member comprises an additional chamber disposed substantially opposite to said chamber, said additional chamber being configured to periodically fluidly connect two of said first fluid supply passages to equalize fluid pressure within said two first lubricant supply passages;

said means for keeping said inner ring-shaped member from rotating comprises a pin disposed through at least a portion of each of said inner ring-shaped member and said outer ring-shaped member;

said inner ring-shaped member is configured to be radially movable within said channel to allow for fluctuations between said outer propeller shaft and the hull;

said at least one fourth fluid supply passage comprises two fourth fluid supply passages disposed spaced apart circumferentially from one another to provide essentially unobstructed lubricant access from said channel into said chamber during said fluctuations;

said second surface of said bearing comprises a plurality of axial grooves adjacent said inner surface of outer shaft;

said first lubricant supply passages of said outer shaft further comprise additional radial lubricant passages disposed between said axial grooves and said axial passage portions;

said second lubricant supply passages are disposed from said axial grooves to said first bearing surface;

said second lubricant supply passages comprise a plurality of spaced apart rows of said second lubricant supply passages;

each of said plurality of spaced apart rows comprising a plurality of spaced apart ones of said second passages;

said bearing has a length;

said spaced apart ones of said second lubricant supply passages comprise regularly spaced ones of said second lubricant supply passages along a substantial portion of the length of said bearing to provide lubricant to said bearing along the substantial portion of the length of said bearing; and said lubricant comprises oil.

16. A propeller assembly for a ship, the ship having a hull for being borne by water, and said propeller assembly comprising:

inner and outer propeller shafts disposed concentrically to one another and passing through the hull, said inner and outer propeller shafts being configured to rotate in opposite directions with respect to one another;

at least one bearing disposed between the inner shaft and the outer shaft, said at least one bearing having a first surface disposed adjacent said inner shaft, and a second surface disposed adjacent said outer shaft;

said bearing comprises a plurality of fixed positions spaced apart from one another about a circumference of said bearing;

said bearing is attached to said outer shaft;

said second surface of said bearing is fixedly attached to said inner surface of said outer shaft;

said first surface of said bearing is relatively rotatable with respect to said inner shaft; and means for conducting lubricant to at least one of said first and said second bearing surfaces at a bearing position fixed relative to the hull of the ship, said means for conducting lubricant comprises means for conducting lubricant to said first surface at only one of said plurality of fixed positions.

17. The assembly according to claim 16, wherein:

said propeller assembly defines a longitudinal axis about which said inner and said outer shafts rotate;

said outer shaft has an inner surface disposed adjacent said at least one bearing, and an outer surface disposed away from said at least one bearing;

said means for conducting lubricant comprises:

a lubricant supply source;

a plurality of first lubricant passages disposed circumferentially about and through said outer shaft from said outer surface thereof to said inner surface thereof to conduct lubricant to said at least one bearing, said plurality of first lubricant passages being rotatable about said inner shaft upon rotation of said outer shaft about said inner shaft;

a plurality of second lubricant supply passages disposed circumferentially about said bearing and connected to said said first lubricant supply passages to conduct lubricant from said first lubricant passages to said first bearing surface at only said one of said plurality of fixed positions; and rotary transmission means connecting said lubricant supply source to ones of said plurality of first lubricant passages located adjacent said lower portion of said bearing to conduct said lubricant to only said one of said plurality of fixed positions.

18. The system according to claim 17, wherein said rotary transmission means is fixedly attached to the hull, and said rotary transmission means comprises:

a first outer ring-shaped member disposed about said outer shaft and for being fixedly attached to the hull, said outer ring-shaped member having an inner circumferential surface for being disposed adjacent said outer surface of said outer shaft;

said outer ring-shaped member comprising a channel along said inner circumferential surface, said channel having a diameter;

a second inner ring-shaped member for being disposed within said channel of said outer ring-shaped member, said inner ring-shaped member having an external diameter, said external diameter being less than said diameter of said channel to form a ring-shaped gap between said inner ring-shaped member and said outer ring-shaped member;

means for keeping said inner ring-shaped member from rotating within said outer ring-shaped member;

said inner ring-shaped member has an inner surface disposed in radial contact with said outer surface of said outer shaft, said inner ring-shaped member being configured for rotation of said outer shaft within said inner surface thereof;

said inner ring-shaped member has a portion for being disposed adjacent said one fixed position of said bearing, and said inner surface of said inner ring-shaped member comprising a chamber in said portion of said inner ring-shaped member;

said chamber is fluidly connect to ones of said plurality of first lubricant supply passages as said ones of said plurality of first lubricant supply passages are rotated past said chamber;

said outer ring-shaped member comprises a third lubricant supply passage disposed therethrough from said outer circumferential surface to said inner circumferential surface to fluidly connect said channel with said lubricant supply source; and said inner ring-shaped member comprising at least one fourth lubricant supply passage disposed therethrough to fluidly connect said channel with said chamber.

19. The system according to claim 18, wherein:

said bearing has an upper portion and a lower portion, the lower portion being disposed substantially vertically below the upper portion, and the lower portion comprising a lowest portion thereof;

said one fixed position comprises a position at the lowest portion of said bearing;

said chamber has a length along a circumference of said inner surface of said inner ring-shaped member;

said ones of said plurality of first lubricant supply passages are disposed circumferentially about said outer shaft at regularly spaced apart intervals;

the length of said chamber is at least as long as said spaced apart intervals to continuously fluidly connect at least one of said first lubricant supply passages to said lubricant supply, and periodically fluidly connect at least two of said first lubricant supply passages, upon said first lubricant supply passages rotating past said chamber;

said at least one bearing is disposed a distance away from the hull in a direction along said longitudinal axis;

at least a portion of each of said plurality of first lubricant supply passages is disposed axially within said outer shaft and parallel to the longitudinal axis along at least a portion of said distance between said at least one bearing and the hull;

each of said first lubricant supply passages comprises at least one additional passage portion disposed radially to said axial passage portions, said radial passage portions being disposed from said outer surface of said outer shaft to said axial passage portions within said outer shaft;

the length of said chamber is about 1/6th of the circumference of said inner surface of said inner ring-shaped member, and about one-half of said chamber is disposed on each side of the lowest portion of the bearing;

said plurality of first lubricant supply passages comprise eight lubricant supply passages and said spaced apart intervals comprise ⅛th of the circumference of said outer surface of said outer shaft;

said inner surface of said inner ring-shaped member comprises an additional chamber disposed substantially opposite to said chamber, said additional chamber being configured to periodically fluidly connect two of said first lubricant supply passages to equalize fluid pressure within said two first lubricant supply passages;

said means for keeping said inner ring-shaped member from rotating comprises a pin disposed through at least a portion of each of said inner ring-shaped member and said outer ring-shaped member;

said inner ring-shaped member is configured to be radially movable within said channel to allow for fluctuations between said outer propeller shaft and the hull;

said at least one fourth fluid supply passage comprises two fourth fluid supply passages disposed spaced apart circumferentially from one another to provide essentially unobstructed lubricant access from said channel into said chamber during said fluctuations;

said second surface of said bearing comprises a plurality of axial grooves adjacent said inner surface of outer shaft;

said first lubricant supply passages of said outer shaft further comprise additional radial lubricant passages disposed between said axial grooves and said axial passage portions;

said second lubricant supply passages are disposed from said axial grooves to said first bearing surface;

said second lubricant supply passages comprise a plurality of spaced apart rows of said second lubricant supply passages;

each of said plurality of spaced apart rows comprising a plurality of spaced apart ones of said second lubricant supply passages;

said bearing has a length;

said spaced apart ones of said second lubricant supply passages comprise regularly spaced ones of said second lubricant supply passages along a substantial portion of the length of said bearing to provide lubricant to said bearing along the substantial portion of the length of said bearing; and said lubricant comprises oil.

* * * * *